United States Patent [19]

Alston et al.

[11] Patent Number: 4,482,919
[45] Date of Patent: Nov. 13, 1984

[54] APPARATUS FOR OBSCURING BLANK SPACES BETWEEN RASTER LINES AND HARD COPIES MADE FROM SCREEN CRT

[75] Inventors: Lawrence E. Alston, Chelmsford; David S. Haroutunian, Chelsea, both of Mass.

[73] Assignee: Polaroid Corporation, Cambridge, Mass.

[21] Appl. No.: 378,089

[22] Filed: May 14, 1982

[51] Int. Cl.³ .......................... H04N 5/04; H04N 5/34
[52] U.S. Cl. .................................. 358/152; 358/244; 358/242
[58] Field of Search ................ 358/244, 332, 34, 335, 358/302, 150, 140, 152, 302, 244.1, 244.2, 111, 345; 455/161

[56] References Cited

U.S. PATENT DOCUMENTS

| | | | |
|---|---|---|---|
| 2,625,604 | 1/1953 | Edson | 358/138 |
| 3,499,983 | 3/1970 | Masters | 178/7.5 |
| 4,096,530 | 6/1978 | Plugge et al. | 358/244 |
| 4,251,835 | 2/1981 | Eriksen | 358/152 |
| 4,264,976 | 4/1981 | Yamashita | 455/161 |
| 4,307,421 | 12/1981 | Smit | 358/152 |

*Primary Examiner*—John C. Martin
*Attorney, Agent, or Firm*—Edward S. Roman

[57] ABSTRACT

A high ratio multilaced raster scan system for obscuring the blank spaces between the raster lines on a CRT when making a photograph or hard copy from the screen of the CRT utilizes a selectively varied DC bias voltage to vertically offset in a select sequence succeeding pulses in the vertical ramp pulse train signal which controls the vertical sweep position of the electron beam of the CRT to thereby provide a corresponding sequence of parallel interlaced raster lines vertically offset with respect to each other. The system is calibrated in a simple manner by utilizing an alternating DC bias voltage to vertically offset alternate pulses in the vertical ramp pulse train signal and thereby enable the user to calibrate the average DC level of the selectively varied DC bias voltage by aligning the raster lines of the first and second fields.

11 Claims, 7 Drawing Figures

APPARATUS FOR OBSCURING BLANK SPACES BETWEEN RASTER LINES AND HARD COPIES MADE FROM SCREEN CRT

BACKGROUND OF THE INVENTION

1. Field of the Invention

This invention relates generally to a high ratio multilaced raster scan system for a CRT and, more particularly, to a system for providing a high ratio multilaced raster scan on a CRT in order to obscure the spaces between the raster lines when making a hard copy from the screen of the CRT.

2. Description of the Prior Art

As is well known, photographs or hard copies are often made from electronic images displayed on the screen of a CRT. As is also well known, CRT's operate to convert video signals to electronic images, and the video signals may originate from any variety of sources such as a conventional television receiver, a video tape, or a computer from which the image was generated in a well-known manner. Since electronic images displayed on the screen of the CRT are transitory in that they exist only so long as the CRT is operative, it is often desirable to record such electronic images on a hard copy such as a photograph. Each electronic image displayed on the screen of the CRT, however, is composed from a plurality of horizontally spaced apart raster lines presented at a rate of 60 fields to 30 frames per second. In the United States, the raster lines of two fields forming each frame are spatially interlaced to produce a composite frame of 525 horizontal lines. In making a photograph or hard copy from the screen of such a CRT, however, the blank spaces between the horizontal raster lines are clearly visible in the photograph, and thus it has been suggested that the raster lines be further interlaced to obscure the visibility of the blank spaces between the horizontal raster lines in any hard copy made from the screen of the CRT. Toward this end, systems have been developed in which the succeeding vertical sync pulses of the vertical sync pulse train signal are phase shifted with respect to each other in order to shift the whole raster downwardly in repeatable numbers of increments. Such systems, however, generally involve delay lines and other complex and costly circuitry.

In U.S. Pat. No. 4,251,835, entitled "Image-Forming System for Obscuring Poster Lines", by Joern B. Eriksen, issued Feb. 17, 1981, there is disclosed a system for doubling the interlace in a CRT raster in order to obscure the blank spaces between the horizontal raster lines in a hard copy made from the screen of the CRT by impressing a DC bias voltage to the vertical ramp pulse train signal so as to vertically shift the horizontal raster lines without introducing a phase shift to succeeding pulses in either the vertical sync pulse train or the vertical ramp pulse train signals. This system appears to be simpler and less costly than the aforementioned systems which require circuits for injecting a phase shift to succeeding vertical sync pulses. However, it also has only a limited capability in that it can only double the interlace and cannot provide higher multiples of interlace raster scans. In addition, although the offsetting DC bias voltage which is combined with the vertical ramp pulse train signal might be calibrated by simply viewing the screen of the CRT since there is only provided a doubling of the interlace raster scan, such calibration would become virtually impossible in a higher ratio multiple interlace system.

Therefore, it is a primary object of this invention to provide a high ratio multiple interlace raster scan system for a CRT in order to obscure the visibility of the blank spaces between the horizontal raster lines of the CRT by combining a DC biasing or offsetting voltage with the vertical ramp pulse train signal without offsetting the phase relationship between succeeding vertical ramp pulses.

It is a further object of this invention to provide a high ratio multiple interlace raster scan system for a CRT wherein the visibility of the blank spaces between the horizontal raster lines are minimized in any hard copy made from the screen of the CRT and there are also included simple means for calibrating the system so that the high multiple interlace raster lines are uniformly spaced apart across the screen of the CRT.

Other objects of the invention will, in part, be obvious and will, in part, appear hereinafter. The invention accordingly comprises a mechanism and system possessing the construction, combination of elements and arrangement of parts which are exemplified in the following detailed disclosure.

SUMMARY OF THE INVENTION

The system of this invention provides multiple interlaced raster lines on a CRT so as to minimize the visibility of the blank spaces between the raster lines in order that a hard copy may be made from the screen of the CRT. The system comprises means responsive to a composite video waveform for stripping and separating sync pulses from the video waveform to provide vertical and horizontal sync pulse trains. Means are also provided which respond to the vertical and horizontal sync pulse trains to produce, respectively, vertical and horizontal ramp pulse train signals to control, respectively, the vertical and horizontal position of the electron beam of the CRT. Interlacing means respond to the vertical sync pulse train to provide a DC bias voltage in combination with the vertical ramp pulse train signal. The DC bias voltage is selectively varied in synchronism with the vertical sync pulse train through a repetitious sequence of different DC bias voltage levels to vary the DC level of the vertical ramp pulse train signal through the sequence of DC voltage levels. This provides a corresponding sequence of parallel interlaced raster lines vertically offset with respect to each other. Means are also provided for calibrating the DC bias voltage levels such that the vertical offset raster lines are equally spaced apart across the screen of the CRT.

The vertical and horizontal ramp pulse train signals are phase related with respect to each other in a well-known manner to provide a first field of raster lines and a second field of raster lines interlaced with the raster lines of the first field which collectively define a frame. The calibration means comprise a selectively actuatable means for providing an alternating DC bias voltage at the output of the interlacing means in synchronization with the vertical sync pulse train for varying the DC level of alternate ramp pulses of the vertical ramp pulse train signal to vertically offset the raster lines of one of the two fields to coincide with the raster lines of the other of the two fields when the alternating DC bias voltage is combined with the vertical ramp pulse train signal. Means are also provided for selectively varying the DC output voltage level from the interlacing means to enable the raster lines of the first and second fields to be visibly aligned with respect to each other.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
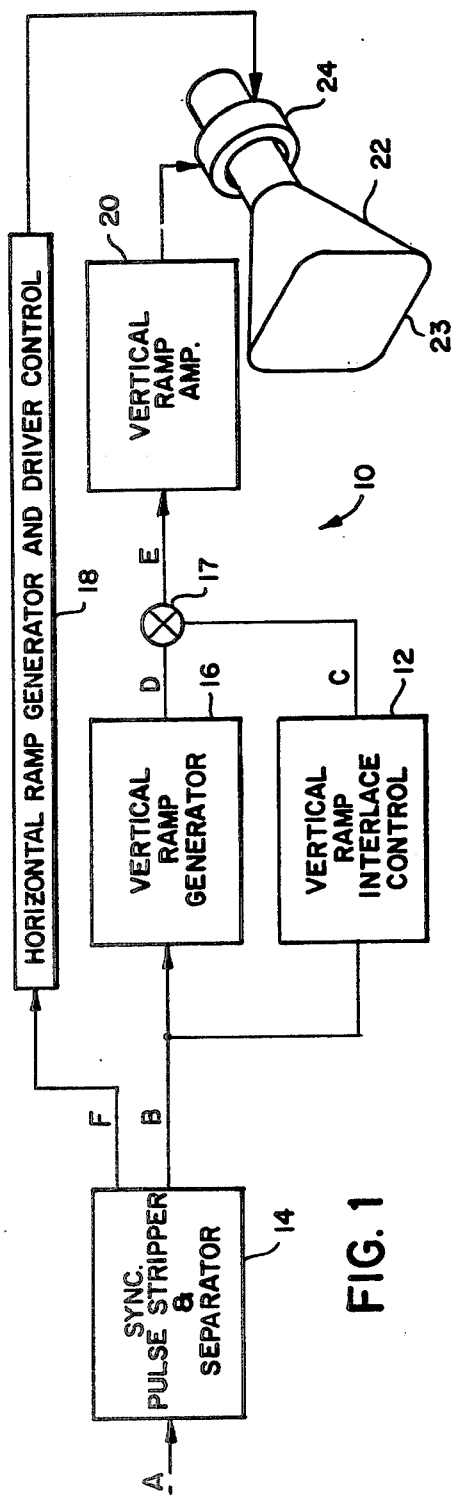
FIG. 1 is a block diagram of a system embodying the high ratio multiple interlacing system of this invention.
Figure 3:
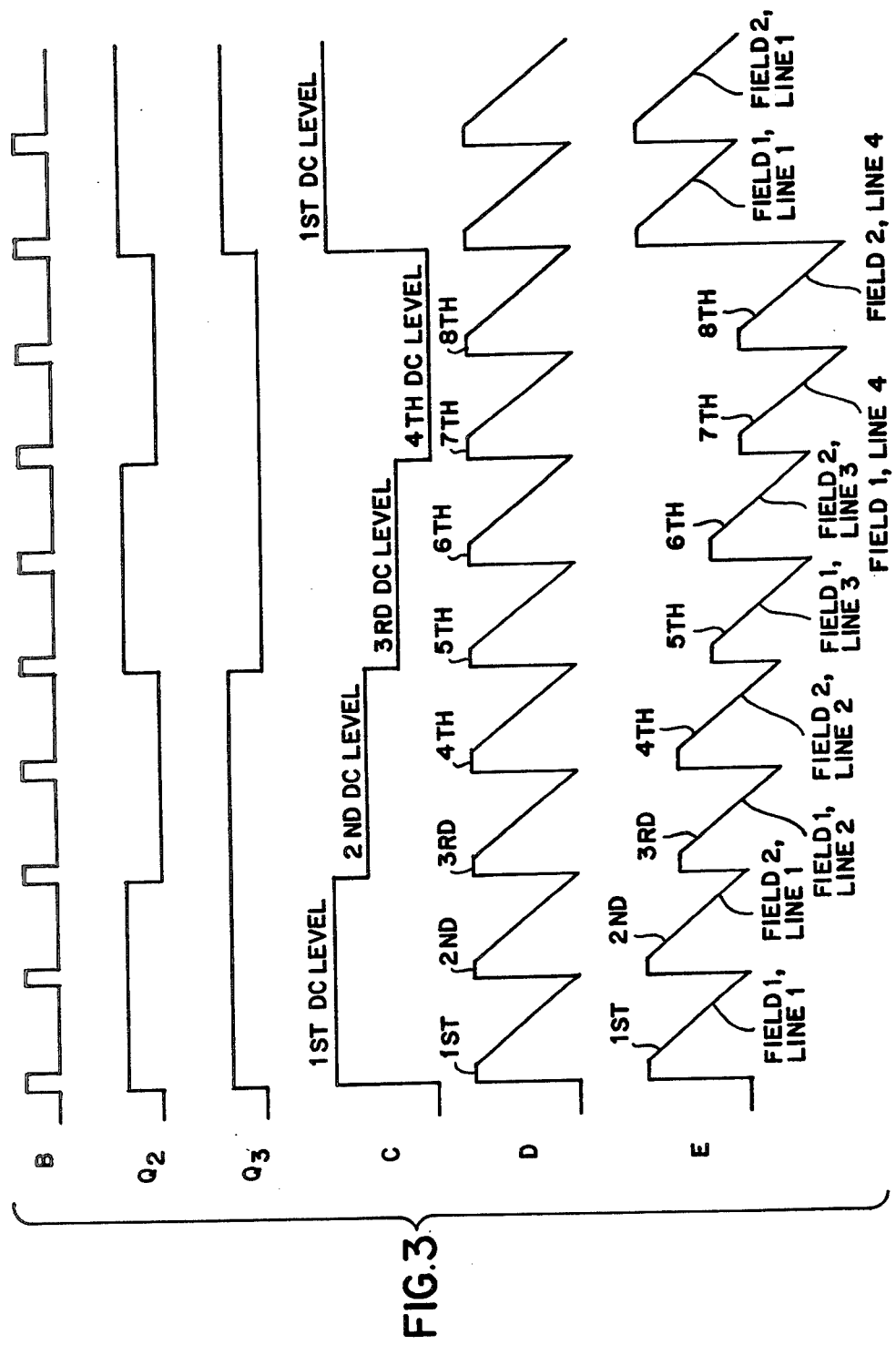
FIG. 3 is a diagram for showing various signal waveforms at select locations in the block diagram of FIG. 1.
Figure 4:
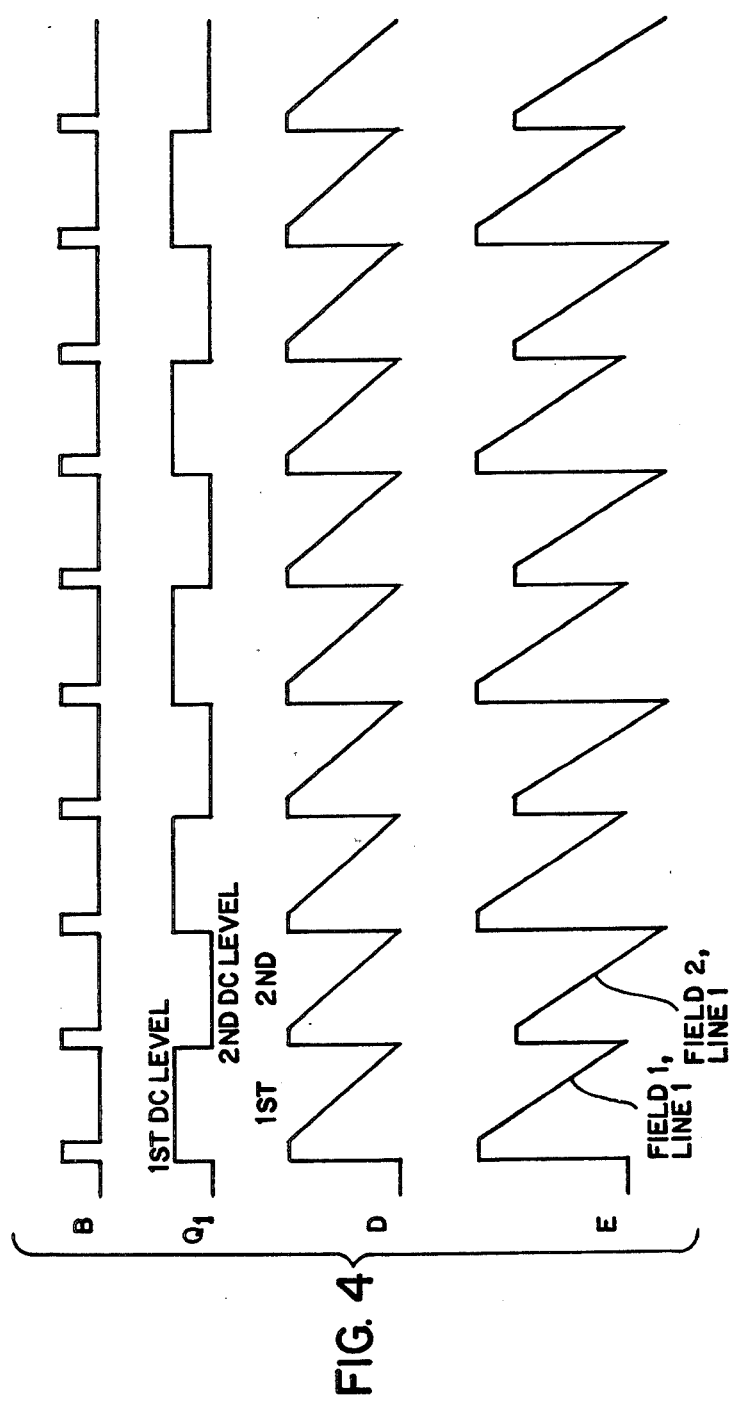
FIG. 4 is a block diagram for various signal waveforms at select locations in the block diagram of FIG. 1 when utilized in a different mode of operation from that of FIG. 3.

Referring to FIG. 1, there is shown a block diagram for an electron beam deflection control circuit 10 for providing a typical raster scan. The deflection control circuit 10 comprises a sync pulse stripper and separator 14 which may be of a conventional type which is well known in the art for receiving a conventional composite video signal at input line A in order to strip horizontal and vertical sync pulses therefrom. The stripper and separator 14 thus provides horizontal and vertical sync pulse train signals at output lines F and B, respectively. The vertical sync pulse train signal as shown at B in FIGS. 3 and 4 is transmitted, in turn, to a vertical ramp generator 16 in order to produce a vertical ramp pulse train signal at output line D as shown at D in FIGS. 3 and 4. The ramp pulse train signal D, in turn, is transmitted to the input line E of a vertical ramp amplifier 20 for amplification and subsequent transmission to deflection coils as shown generally at 24 in a CRT 22. The horizontal sync pulse train signal stripped from the composite video signal A by the pulse stripper and separator 14 is subsequently transmitted to a horizontal ramp generator and driver control 18 for generation of a horizontal ramp pulse train signal (not shown) in a well-known manner. The horizontal ramp pulse train signal is also thereafter directed to the deflection coils 24 of the CRT 22.

The horizontal and vertical ramp pulse train signals operate in a well-known manner to control the horizontal and vertical deflection of the electron beam of the CRT 22 to form the desired raster scan image. The actual intensity of the electron beam is controlled in a well-known manner by a Z axis control circuit (not shown) and which need not be further described with regard to the present invention.

A vertical ramp interlace control 12 is provided in accordance with this invention for incorporation in the aforementioned deflection control circuit 10 and comprises a four bit binary counter 26 connected to receive the vertical sync pulse train B. The counter 26, in turn, includes three output terminals $Q_1$, $Q_2$, and $Q_3$ for providing selected DC bias voltage output levels which vary in response to selected multiples of the vertical sync pulses of the vertical sync pulse train B. The output terminal $Q_1$ connects to a calibration circuit comprising a bypass resistor $R_9$, a switch $S_1$, and a potentiometer $R_8$. The other output terminals $Q_2$ and $Q_3$ connect to a ladder network as shown generally at 28 comprising resistors $R_1$, $R_2$, $R_3$, and $R_4$. Typically, in ladder networks of this type resistors $R_1$, $R_2$, and $R_4$ are twice the value of $R_3$ so as to maintain a uniform output impedance as the DC bias voltage levels from terminals $Q_2$, and $Q_3$ vary. The output from the ladder network 28 also connects by way of switch $S_1$ and resistors $R_6$ and $R_7$ to provide a variable DC bias voltage at output line C as shown at C in FIG. 3 in the manner of this invention to be subsequently described. The variable DC bias voltage C is subsequently summed with the vertical ramp pulse train signal D by way of a summing junction 17 as shown in FIG. 1.

Figure 5:
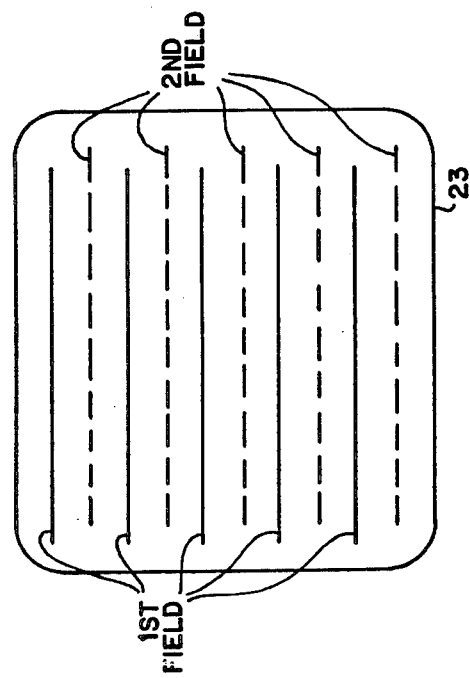
FIG. 5 is a diagram of a conventional raster scan arrangement on the screen of a CRT.
Figure 7:
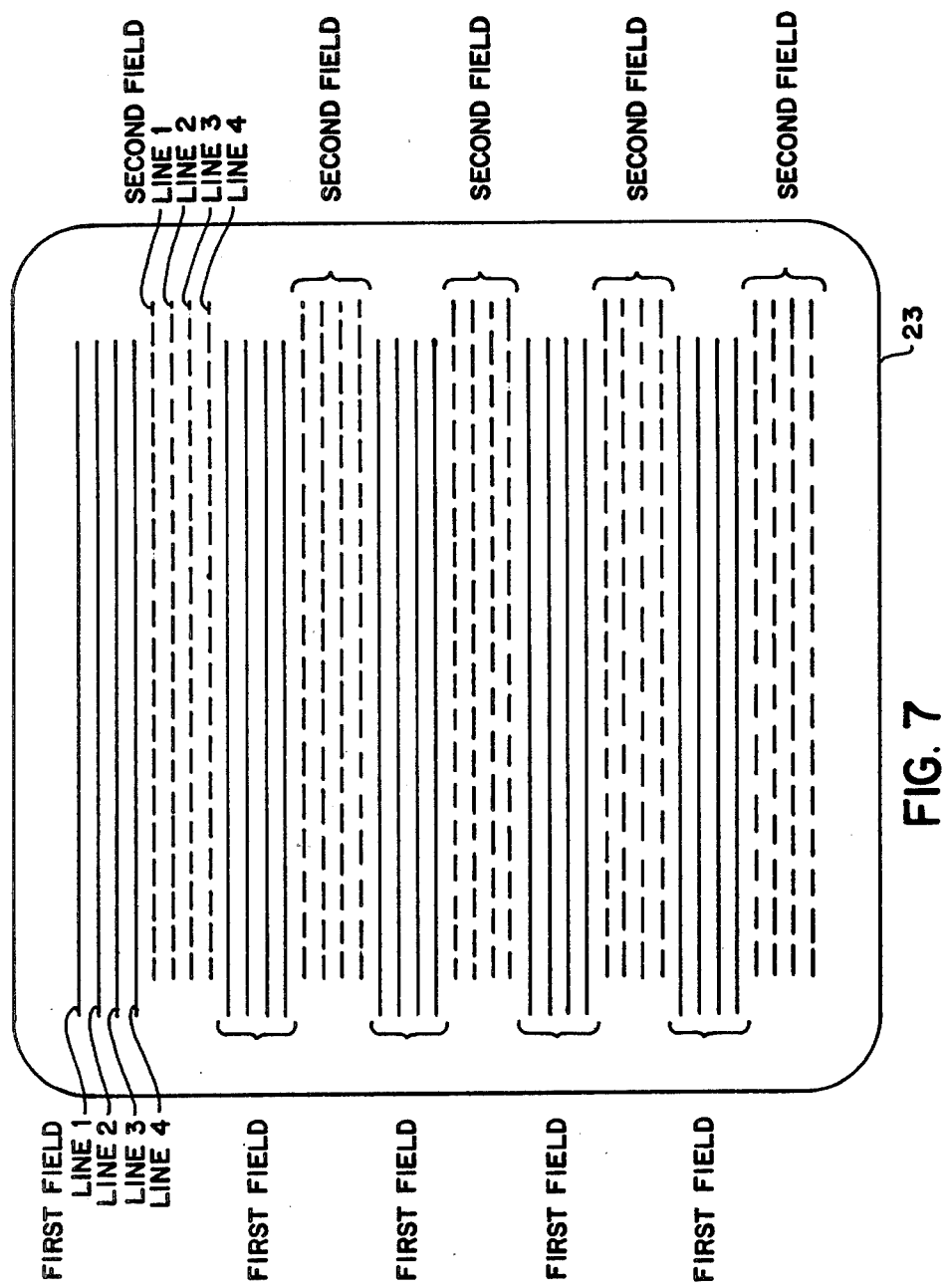
FIG. 7 is a diagram of a raster scan on the screen of a CRT when multilaced by the circuit of FIG. 2.

Typical values for the resistors $R_1$-$R_9$ may be as follows:

$R_1 = 20K\Omega$
$R_2 = 20K\Omega$
$R_3 = 10K\Omega$
$R_4 = 20K\Omega$
$R_6 = 10K\Omega$
$R_7 = 100K\Omega$
$R_8 = 2K\Omega$
$R_9 = 10K\Omega$ The horizontal and vertical ramp pulse train signals directed to the deflection coils 24 of the CRT 22 are phase related with respect to each other in a well-known manner so as to provide a first field of raster lines as shown on the screen 23 of the CRT 22 in FIG. 5 and a second field of raster lines as also shown on the screen 23 of the CRT 22 in FIG. 5 interlaced with the raster lines of the first field to collectively define a single television frame. In a conventional television environment, each frame comprises two fields of $262\frac{1}{2}$ raster lines each presented at a rate of 60 fields or 30 frames per second. The raster lines of the two fields forming each frame are spatially interlaced to produce a conventional television frame of 525 lines of which only a small portion are diagrammatically illustrated as appearing on the screen 23 of the CRT 22 in FIG. 5. Thus, there is provided a 2:1 frame interlace to permit an image with acceptable resolution to be produced at a rate sufficient to eliminate perceptible flicker. However, in situations where the screen 23 of the CRT 22 is employed to produce a hard copy of the television image, a 2:1 interlace may not be sufficient to eliminate the visibility of the blank spaces between the raster lines in the hard copy. Thus, in order to minimize the visibility of blank spaces between the raster lines of any hard copy made from the screen 23 of the CRT 22, there is provided the vertical ramp interlace control circuit 12 of this invention to provide a 4:1 field interlace or a total frame interlace of 8:1 as best shown on the screen 23 of the CRT 22 in FIG. 7 and as will now be described in greater detail herein.

Referring again to FIG. 2 in conjunction with FIG. 3, there are shown the output waveforms at output terminals $Q_2$ and $Q_3$ of binary counter 26 and their phase relationship with respect to the vertical sync pulse train signal B. As is readily apparent, each of the output signals at the terminals $Q_2$ and $Q_3$ switches in an alternating manner between a low DC level which may be equivalent to a binary logic 0 and a high DC level which may be equivalent to a binary logic 1. More specifically, the output signal at the terminal $Q_2$ switches upon the binary counter 26 counting two vertical sync pulses and thus has a frequency equal to one-fourth the frequency of the vertical sync pulse train signal B. In like manner, the output signal at the terminal $Q_3$ switches upon the binary counter 26 counting four vertical sync pulses and therefore has a frequency equal to one-eighth the frequency of the vertical sync pulse train signal B.

The output signals at the terminals $Q_2$ and $Q_3$ of the binary counter 26 are combined by the ladder network 28 to provide the output signal waveform as shown at C in FIG. 3. As is readily apparent, the output waveform C is stepped at four discrete DC bias levels which are combined by the summing junction 17 with the vertical ramp pulse train signal D when the switch $S_1$ is in the phantom line position shown in the drawing to provide the interlaced vertical pulse train signal at line E in FIG. 1 and as shown at E in FIG. 3. As is readily apparent, the first and highest DC bias level of the waveform C is summed with the first two ramp pulses of the vertical ramp pulse train D to provide the highest DC offset to the first two ramp pulses as shown at E. In correlating the vertical ramp pulses of the pulse train E with the raster scan display on the screen 23 of the CRT 22 in FIG. 7, it can be seen that the first vertical ramp pulse of the pulse train E controls all the line 1 vertical positions of the first field and the second vertical ramp pulse of the pulse train E controls all the line 1 vertical positions of the second field.

The second highest DC bias level of the output waveform C from the vertical ramp interlace control circuit 12 is summed with the third and fourth vertical ramp pulses of the vertical ramp pulse train signal D to provide the second highest DC offset to the third and fourth vertical ramp pulses in the vertical ramp pulse train signal E which, as is readily apparent, are DC biased downwardly from the previous first and second vertical ramp pulses. Thus, the third vertical ramp pulse controls all the line 2 vertical positions in the first field and the fourth vertical ramp pulse controls all the line 2 vertical positions in the second field which, as is readily apparent, are vertically offset downwardly with respect to all the corresponding line 1 positions.

In like manner, the third highest DC bias level of the output waveform C from the vertical ramp interlace control circuit 12 is summed with the fifth and sixth vertical ramp pulses of the vertical ramp pulse train signal D to provide the third highest DC offset to the fifth and sixth vertical ramp pulses of the waveform E which, as is readily apparent, are DC biased downwardly from the previous third and fourth vertical ramp pulses. Thus, the fifth vertical ramp control pulse determines all the line 3 vertical positions of the first field and the sixth vertical ramp pulse determines all the line 3 vertical positions of the second field which, as is readily apparent, are vertically offset downwardly with respect to all the corresponding line 2 vertical positions.

Lastly, the fourth DC level, which is the lowest of all the DC bias levels of the waveform C from the vertical ramp interlace control 12, is summed with the seventh and eighth vertical ramp pulses of the waveform D to provide the lowest offset to the seventh and eighth vertical ramp pulses in the pulse train E which, as is readily apparent, are DC biased downwardly from the previous fifth and sixth vertical ramp pulses. Thus, the seventh vertical ramp pulse determines all the line 4 vertical positions in the first field, and the eighth vertical ramp pulse determines all the line 4 vertical positions in the second field which are vertically displaced downwardly with respect to all the corresponding line 3 positions to ultimately provide a field interlace of 4:1 and a complete frame interlace of 8:1 as best shown on the screen 23 of FIG. 7.

In this manner, the vertical ramp interlace control circuit 12 responds to the vertical sync pulse train B to provide a DC bias voltage for combination with the vertical pulse train signal D. The DC bias voltage from the vertical interlace control 12 is selectively varied in synchronism with the vertical sync pulse train through a repetitious sequence of different DC bias voltage levels to vary the DC level of the vertical ramp pulse train signal D through the sequence of DC voltage levels and thereby provide a corresponding sequence of parallel interlaced raster lines vertically offset with respect to each other. Although a 4:1 field interlace or an 8:1 frame interlace has been shown, it will be readily apparent that the interlace could be increased to a 16:1 frame interlace by simply adding an additional output terminal to the binary counter to provide a varying DC level at one-sixteenth the frequency of the vertical sync pulse train B and which connects to an additional stage of the ladder network 28 in a manner as is well known in the art. As will be readily appreciated, this high ratio of interlaces enables a hard copy to be made from the screen 23 of the CRT 22 in a manner which substantially eliminates the visibility of the blank spaces between the raster lines.

The average DC level of the waveform C relative to ground must be adjusted by the potentiometer $R_8$ to assure that the interlaced raster lines of the first field do not overlap the interlaced raster lines of the second field. This adjustment, however, cannot be accomplished by simply viewing the screen 23 of the CRT 22 to align the raster lines of the first and second fields since in such a highly interlaced system it becomes virtually impossible for the viewer to distinguish the raster lines of the first and second fields from each other even with a magnifying glass. Toward this end, there is provided a simple and easy means for calibrating the average DC level of the waveform C relative to ground to assure that all the interlaced raster lines are equally spaced apart across the screen of the CRT 22 without the raster lines of the first field overlapping the raster lines of the second field. Thus, with the switch $S_1$ moved to the solid line position as shown in FIG. 2, it is apparent that the ladder network 28 becomes disconnected and in its place there is substituted the bypass resistor $R_9$ connected to the output terminal $Q_1$.

Figure 2:
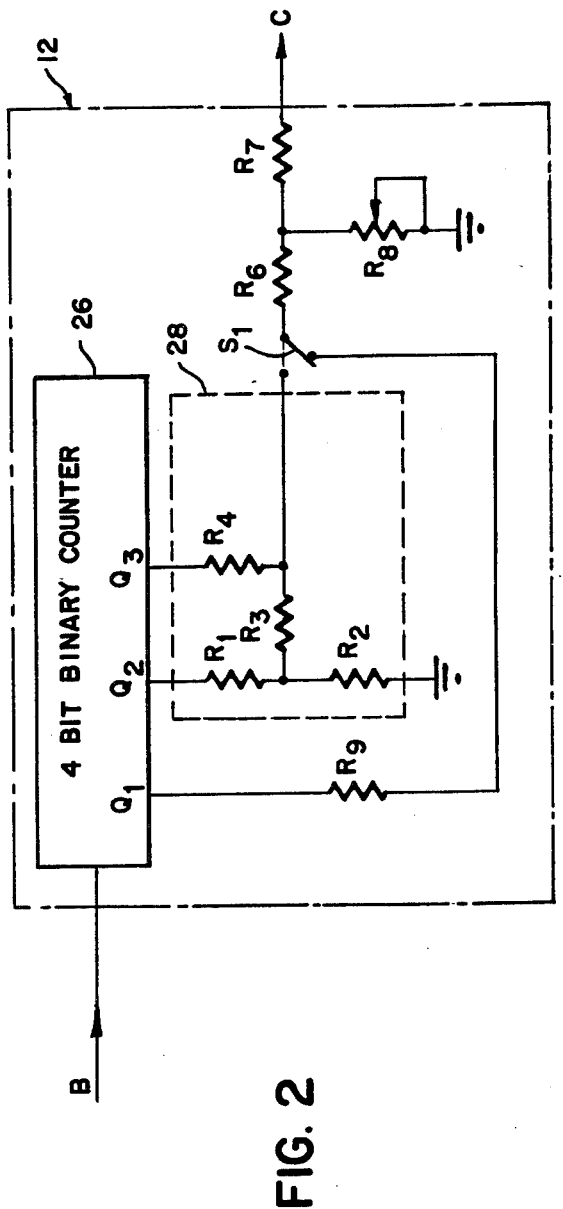
FIG. 2 is a circuit diagram for the high ratio multiple interlacing feature of this invention.
Figure 6:
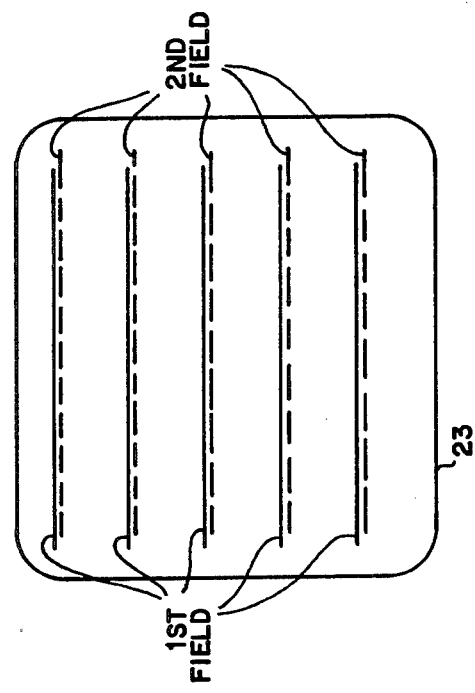
FIG. 6 is a diagram of a raster scan arrangement on the screen of the CRT as modified by a calibration arrangement as shown in FIG. 2.

Referring now to FIG. 4 in conjunction with FIG. 2, it can be seen that the output signal from the terminal $Q_1$ switches in response to the binary counter 26 counting each vertical sync pulse of the vertical sync pulse train signal B to provide an alternating DC bias voltage at one-half the frequency of the vertical sync pulse train signal D. Thus, the DC bias voltage output from the terminal $Q_1$ of the binary counter 26 alternates between a low DC bias level which may be a binary logic 0 and a high DC bias level which may be a binary logic 1. Since the ladder network 28 is disconnected as a result of connecting the switch $S_1$ in the solid line position as shown in FIG. 2, there will no longer be provided the high ratio multiple interlace raster scan as shown on the screen 23 of the CRT 22 in FIG. 7 and instead there will be provided a conventional 2:1 frame interlace as shown on the screen 23 of FIG. 6. As previously discussed, the conventional 2:1 frame interlace between the first and second fields as shown in FIG. 5 is provided in a well-known manner by controlling the phase relationship between a vertical and horizontal ramp pulse train signal.

Referring back to FIG. 4, it can be seen that the alternating DC bias level at the output terminal $Q_1$ of the binary counter 26 is subsequently combined with the vertical ramp pulse train signal D to provide the vertical ramp pulse train signal E as shown in FIG. 4. As is readily apparent, every second or alternate vertical ramp pulse signal of the pulse train E is DC biased to vertically offset the raster lines of the second field with respect to the first field so that the raster lines of both fields generally coincide as shown on the display screen 23 of FIG. 6. The viewer next adjusts the potentiometer $R_8$ so that the raster lines of the first and second field exactly coincide in this manner positively setting the potentiometer $R_8$ to correctly bias the average DC level of the waveform C such that the interlaced raster lines of the first and second fields as shown on the screen 23 of FIG. 7 become equally spaced apart across the screen of the CRT without overlapping each other.

This calibration adjustment can be easily made since the viewer can easily see when the raster lines of the first and second field spatially overlap in coincidence with each other. After completing the aforementioned calibration adjustment, the user then connects the switch $S_1$ to the ladder network 28 so as to provide the aforementioned 4:1 field interlace or 8:1 frame interlace with each of the raster lines uniformly spaced apart across the viewing screen 23. Thus, there is provided a simple and convenient means for calibrating a high ratio multiple interlace which would otherwise be impossible to visually calibrate.

Although the electron beam deflection control circuit 10 has been described as a DC coupled vertical deflection system, it will be equally apparent that the variable DC bias voltage provided by the high ratio interlaced control circuit of this invention could also be summed with vertical centering coils or with a vertical sweep coil. In addition, it will be readily understood that the composite video signal A may originate from a conventional television receiver, a video tape, a computer from which the image was generated in a well-known manner, or from any other conventional source of composite video signals.

Other embodiments of the invention, including additions, subtractions, deletions, and other modifications of the preferred disclosed embodiments of the invention will be obvious to those skilled in the art and are within the scope of the following claims.

What is claimed is:

1. A system for providing multiple interlaced raster lines on a CRT so as to minimize the visibility of the blank spaces between the raster lines in any hard copy of the screen of the CRT comprising:
   means responsive to a composite video waveform for stripping and separating sync pulses from the video waveform to provide vertical and horizontal sync pulse trains;
   means responsive to said vertical and horizontal sync pulse trains for producing, respectively, vertical and horizontal ramp pulse train signals for controlling, respectively, the vertical and horizontal position of the electron beam of the CRT;
   interlacing means responsive to said vertical sync pulse train for providing a DC bias voltage for combination with said vertical ramp pulse train signal, said DC bias voltage being selectively varied in synchronism with said vertical sync pulse train through a repetitious sequence of different DC bias voltage levels to vary the DC level of said vertical ramp pulse train signal through said sequence of DC voltage levels and thereby provide a corresponding sequence of parallel interlaced raster lines vertically offset with respect to each other; and
   means for calibrating said sequenced DC bias voltage levels such that said vertical offset raster lines are equally spaced apart across the screen of the CRT wherein the frequencies of said vertical and horizontal ramp pulse train signals are phase related with respect to each other so as to provide a first field of raster lines and a second field of raster lines interlaced with the raster lines of said first field to collectively define a frame, and wherein said calibration means comprises selectively actuatable means for providing an alternating DC bias voltage at the output of said interlacing means in synchronization with said vertical sync pulse train for varying the DC level of alternate ramp pulses of said vertical ramp pulse train signal to vertically offset the raster lines of one of said two fields to coincide with the raster lines of the other of said two fields when said alternating DC bias voltage is combined with said vertical ramp pulse train signal, and means for selectively varying the DC output voltage level from said interlacing means to enable the raster lines of said first and second fields to be visually aligned with respect to each other.

2. A system for providing multiple interlaced raster lines on a CRT so as to minimize the visibility of the blank spaces between the raster lines in any hard copy of the screen of the CRT comprising:
   means responsive to a composite video waveform for stripping and separating sync pulses from the video waveform to provide vertical and horizontal sync pulse trains;
   means responsive to said vertical and horizontal sync pulse trains for producing, respectively, vertical and horizontal ramp pulse train signals for controlling, respectively, the vertical and horizontal position of the electron beam of the CRT;
   interlacing means responsive to said vertical sync pulse train for providing a DC bias voltage for combination with said vertical ramp pulse train signal, said DC bias voltage being selectively varied in synchronism with said vertical sync pulse train through a repetitious sequence of different DC bias voltage levels to vary the DC level of said vertical ramp pulse train signal through said sequence of DC voltage levels and thereby provide a corresponding sequence of parallel interlaced raster lines vertically offset with respect to each other; and
   means for calibrating said sequenced DC bias voltage levels such that said vertically offset raster lines are equally spaced apart across the screen of the CRT wherein the frequencies of said vertical and horizontal ramp pulse train signals are phase related with respect to each other so as to provide a first field of raster lines and a second field of raster lines interlaced with the raster lines of said first field to collectively define a frame, and wherein said calibration means comprises selectively actuatable means for providing an alternating DC bias voltage at the output of said interlacing means in synchronization with said vertical sync pulse train for varying the DC level of alternate ramp pulses of said vertical ramp pulse train signal to vertically offset the raster lines of one of said two fields to coincide with the raster lines of the other of said two fields when said alternating DC bias voltage is combined with said vertical ramp pulse train signal, and means for selectively varying the DC output voltage level from said interlacing means to enable the raster lines of said first and second fields to be visually aligned with respect to each other, and wherein said selectively actuatable means for providing said alternating DC bias voltage comprises a binary counter which switches to provide a different one of two DC bias voltages in response to each vertical sync pulse, and a selectively actuatable switch for connecting the output from said binary counter to the output from said interlacing means; and wherein said means for selectively varying the output voltage level from said interlacing means comprises a variable resistor.

3. A system for providing multiple interlaced raster lines on a CRT so as to minimize the visibility of the blank spaces between the raster lines in any hard copy of the screen of the CRT comprising:
means responsive to a composite video waveform for stripping and separating sync pulses from the video waveform to provide vertical and horizontal sync pulse trains;
means responsive to said vertical and horizontal sync pulse trains for producing, respectively, vertical and horizontal ramp pulse train signals for controlling, respectively, the vertical and horizontal position of the electron beam of the CRT;
interlacing means responsive to said vertical sync pulse train for providing a DC bias voltage for combination with said vertical ramp pulse train signal, said DC bias voltage being selectively varied in synchronism with said vertical sync pulse train through a repetitious sequence of different DC bias voltage levels to vary the DC level of said vertical ramp pulse train signal through said sequence of DC voltage levels and thereby provide a corresponding sequence of parallel interlaced raster lines vertically offset with respect to each other; and
means for calibrating said sequenced DC bias voltage levels such that said vertically offset raster lines are equally spaced apart across the screen of the CRT wherein the frequencies of said vertical and horizontal ramp pulse train signals are phase related with respect to each other so as to provide a first field of raster lines and a second field of raster lines interlaced with the raster lines of said first field to collectively define a frame, and wherein said calibration means comprises selectively actuatable means for providing an alternating DC bias voltage at the output of said interlacing means in synchronization with said vertical sync pulse train for varying the DC level of alternate ramp pulses of said vertical ramp pulse train signal to vertically offset the raster lines of one of said two fields to coincide with the raster lines of the other of said two fields when said alternating DC bias voltage is combined with said vertical ramp pulse train signal, and means for selectively varying the DC output voltage level from said interlacing means to enable the raster lines of said first and second fields to be visually aligned with respect to each other and wherein said interlacing means comprises a binary counter having at least two outputs which switch respectively to provide a different one of two DC voltages in response to selected multiples of said vertical sync pulses and a ladder network responsive to the output signals from said binary counter to provide said sequence of different DC bias voltage levels, wherein each of said sequence of different DC bias voltage levels occurs in response to the switching of one of the outputs of said binary counter.

4. In a video system comprising a CRT, means responsive to a composite video waveform for stripping and separating sync pulses from the video waveform to provide vertical and horizontal sync pulse trains, and means responsive to the vertical and horizontal sync pulse trains for producing, respectively, vertical and horizontal ramp pulse train signals for controlling, respectively, the vertical and horizontal position of the electron beam of the CRT, the improvement comprising:
means for providing multiple interlaced raster lines on the CRT so as to minimize the visibility of the blank spaces between the raster lines in any hard copy of the screen of the CRT, said interlacing means being responsive to the vertical sync pulse train for providing a DC bias voltage for combination with the vertical ramp pulse train signal, said DC bias voltage being selectively varied in synchronism with said vertical sync pulse train through a repetitious sequence of different DC bias voltage levels to vary the DC level of the vertical ramp pulse train signal through said sequence of DC voltage levels and thereby provide a corresponding sequence of parallel interlaced raster lines vertically offset with respect to each other, said interlacing means comprising a binary counter having at least two outputs which switch respectively to provide a different one of two DC voltages in response to selected multiples of the vertical sync pulses and a ladder network responsive to the output signals from said binary counter to provide said sequence of different DC bias voltage levels wherein each of said sequence of different DC bias voltage levels occurs in response to the switching of one of the outputs of said binary counter including means for calibrating said sequenced DC bias voltage levels so that said vertically offset raster lines become equally spaced apart across the screen of the CRT.

5. The improvement of claim 4 wherein the frequencies of said vertical and horizontal ramp pulse train signals are phase related to each other so as to provide a first field of raster lines and a second field of raster lines interlaced with the raster lines of the first field to collectively define a frame and wherein said calibration means comprises selectively actuatable means for providing an alternating DC bias voltage at the output of said interlacing means in synchronization with the vertical sync pulse train for varying the DC level of alternate ramp pulses of the vertical ramp pulse train signal to vertically offset the raster lines of one of said two fields to coincide with the raster lines of the other of said two fields when said alternating DC bias voltage is combined with the vertical ramp pulse train signal, and means for selectively varying the DC output voltage level from said interlacing means to enable the raster lines of the first and second fields to be visually aligned with respect to each other.

6. The improvement of claim 5 wherein said selectively actuatable means for providing said alternating DC bias voltage comprises a binary counter which switches to provide a different one of two DC voltages in response to each vertical sync pulse, and a selectively actuatable switch for connecting the output from said binary counter to the output from said interlacing means, and wherein said means for selectively varying the output voltage level from said interlacing means comprises a variable resistor.

7. In a video system comprising a CRT, means responsive to a composite video waveform for stripping and separating sync pulses from the video waveform to provide vertical and horizontal sync pulse trains and means responsive to the vertical and horizontal sync pulse trains for producing, respectively, vertical and horizontal ramp pulse train signals for controlling, respectively, the vertical and horizontal position of the electron beam of the CRT, the improvement comprising:

means for providing multiple interlaced raster lines on the CRT so as to minimize the visibility of the blank spaces between the raster lines in any hard copy of the screen of the CRT, said interlacing means being responsive to the vertical sync pulse train for providing a DC bias voltage for combination with the vertical ramp pulse train signal, said DC bias voltage being selectively varied in synchronism with said vertical sync pulse train through a repetitious sequence of different DC bias voltage levels to vary the DC level of the vertical ramp pulse train signal through said sequence of DC voltage levels and thereby provide a corresponding sequence of parallel interlaced raster lines vertically offset with respect to each other; and means for calibrating said sequenced DC bias voltage levels so that said vertically offset raster lines become equally spaced apart across the screen of the CRT, wherein the frequency of the vertical and horizontal ramp pulse train signals are phase related with respect to each other so as to provide a first field of raster lines and a second field of raster lines interlaced with the raster lines of the first field to collectively define a frame and wherein said calibration means comprises selectively actuatable means for providing an alternating DC bias voltage at the output of said interlacing means in synchronization with the vertical sync pulse train for varying the DC level of alternate ramp pulse of said vertical ramp pulse train signal to vertically offset the raster lines of one said two fields to coincide with the raster lines of the other of said two fields when said alternating DC bias voltage is combined with the vertical ramp pulse train signal, and means for selectively varying the DC output voltage level from said interlacing means to enable the raster lines of the first and second fields to be visually aligned with respect to each other.

8. In a video system comprising a CRT, means responsive to a composite video waveform for stripping and separating sync pulses from the video waveform to provide vertical and horizontal sync pulse trains and means responsive to the vertical and horizontal sync pulse trains for producing, respectively, vertical and horizontal ramp pulse train signals for controlling, respectively, the vertical and horizontal position of the electron beam of the CRT, the improvement comprising:

means for providing multiple interlaced raster lines on the CRT so as to minimize the visibility of the blank spaces between the raster lines in any hard copy of the screen of the CRT, said interlacing means being responsive to the vertical sync pulse train for providing a DC bias voltage for combination with the vertical ramp pulse train signal, said DC bias voltage being selectively varied in synchronism with said vertical sync pulse train through a repetitious sequence of different DC bias voltage levels to vary the DC level of the vertical ramp pulse train signal through said sequence of DC voltage levels and thereby provide a corresponding sequence of parallel interlaced raster lines vertically offset with respect to each other, and means for calibrating said sequenced DC bias voltage levels so that said vertically offset raster lines become equally spaced apart across the screen of the CRT wherein the frequency of the vertical and horizontal ramp pulse train signals are phased related with respect to each other so as to provide a first field of raster lines and a second field of raster lines interlaced with the raster lines of the first field to collectively define a frame and wherein said calibration means comprises selectively actuatable means for providing an alternating DC bias voltage at the output of said interlacing means in synchronization with the vertical sync pulse train for varying the DC level of alternate ramp pulses of said vertical ramp pulse train signal to vertically offset the raster lines of one of said two fields to coincide with the raster lines of the other of said two fields when said alternating DC bias voltage is combined with the vertical ramp pulse train signal, and means for selectively varying the DC output voltage level from said interlacing means to enable the raster lines of the first and second fields to be visually aligned with respect to each other and wherein said selectively actuatable means for providing said alternating DC bias voltage comprises a binary counter which switches to provide a different one of two DC voltages in response to each vertical sync pulse, and a selectively actuatable switch for connecting the output from said binary counter to the output from said interlacing means, and wherein said means for selectively varying the output voltage level from said interlacing means comprises a variable resistor.

9. A system for providing multiple interlaced raster lines on a CRT so as to minimize the visibility of the blank spaces between the raster lines in any hard copy of the screen of the CRT comprising:

means responsive to a composite video waveform for stripping and separating sync pulses from the video waveform to provide a train of vertical and horizontal sync pulse trains;

means responsive to said vertical and horizontal sync pulse trains for producing, respectively, vertical and horizontal ramp pulse train signals for controlling, respectively, the vertical and horizontal position of the electron beam of the CRT; and interlacing means responsive to said vertical sync pulse train for providing a DC bias voltage for combination with said vertical ramp pulse train signal, said DC bias voltage being selectively varied in synchronism with said vertical sync pulse train through a repetitious sequence of different DC bias voltage levels to vary the DC level of said vertical ramp pulse train signal through said sequence of DC bias voltage levels and thereby provide a corresponding sequence of parallel interlaced raster lines vertically offset with respect to each other, said interlacing means comprising a binary counter having at least two outputs which switch respectively to provide a different one of two DC voltages in response to selected multiples of said vertical sync pulses and a ladder network responsive to the output signals from said binary counter to provide said sequence of different DC bias voltage levels wherein each of said sequence of different DC bias voltage levels occurs in response to the switching of one of the outputs of said binary counter including means for calibrating said sequenced DC bias voltage levels so that said vertically offset raster lines become equally spaced apart across the screen of the CRT.

10. The system of claim 9 wherein the vertical and horizontal ramp pulse train signals are phase related to each other so as to provide a first field of raster lines and a second field of raster lines interlaced with the raster lines of the first field to collectively define a frame and wherein said calibration means comprises selectively actuatable means for providing an alternating DC bias voltage at the output of said interlacing means in synchronization with the vertical sync pulse train for varying the DC level of alternate ramp pulses of the vertical ramp pulse train signal to vertically offset the raster lines of one of said two fields to coincide with the raster lines of the other of said two fields when said alternating DC bias voltage is combined with the vertical ramp pulse train signal, and means for selectively varying the DC output voltage level from said interlacing means to enable the raster lines of the first and second fields to be visually aligned with respect to each other.

11. The system of claim 10 wherein said selectively actuatable means for providing said alternating DC bias voltage comprises a binary counter which switches to provide a different one of two DC voltages in response to each vertical sync pulse, and a selectively actuatable switch for connecting the output from said binary counter to the output from said interlacing means, and wherein said means for selectively varying the output voltage level from said interlacing means comprises a variable resistor.

* * * * *

UNITED STATES PATENT AND TRADEMARK OFFICE
CERTIFICATE OF CORRECTION

PATENT NO. : 4,482,919
DATED : November 13, 1984
INVENTOR(S) : Lawrence E. Alston and David S. Haroutunian It is certified that error appears in the above-identified patent and that said Letters Patent are hereby corrected as shown below:

In the title:

After "SCREEN" insert --OF--.

Signed and Sealed this

Fourteenth Day of May 1985

[SEAL]

Attest:

DONALD J. QUIGG

Attesting Officer
Acting Commissioner of Patents and Trademarks